March 3, 1959  C. L. VIGNA ET AL  2,875,556
APPARATUS FOR MOLDING REFRACTORY MATERIALS
Filed July 31, 1953  2 Sheets-Sheet 1
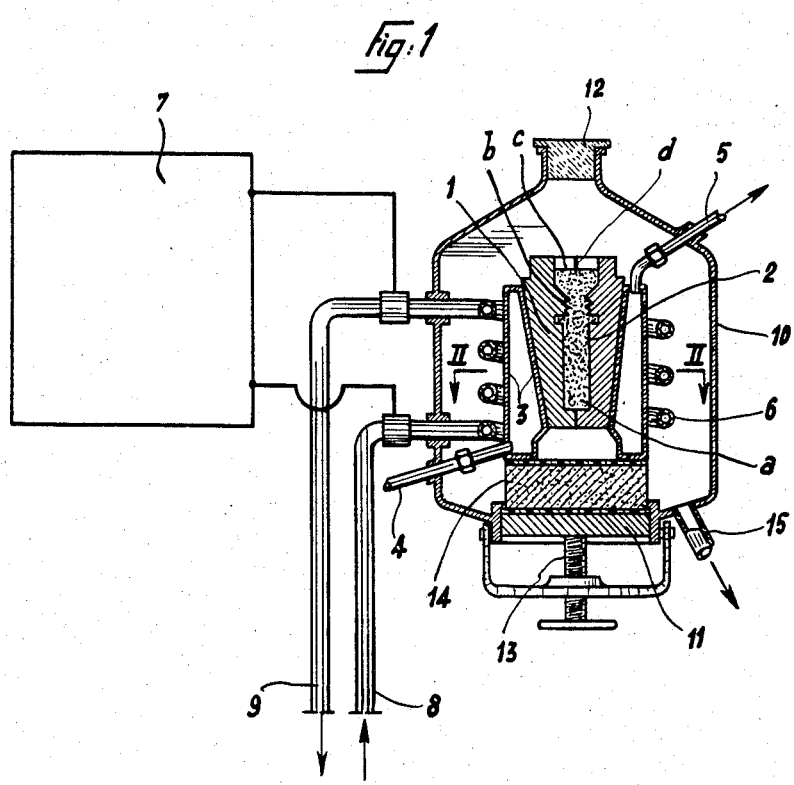
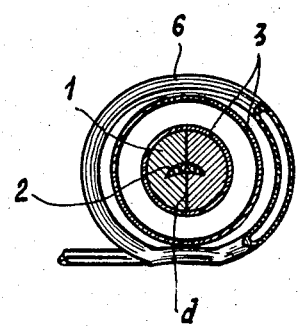
INVENTORS
Cesare Luigi Vigna
Narisara Edward Perkins
Pierre Henri Raoul Leygonie
BY  Bacon & Thomas
ATTORNEYS

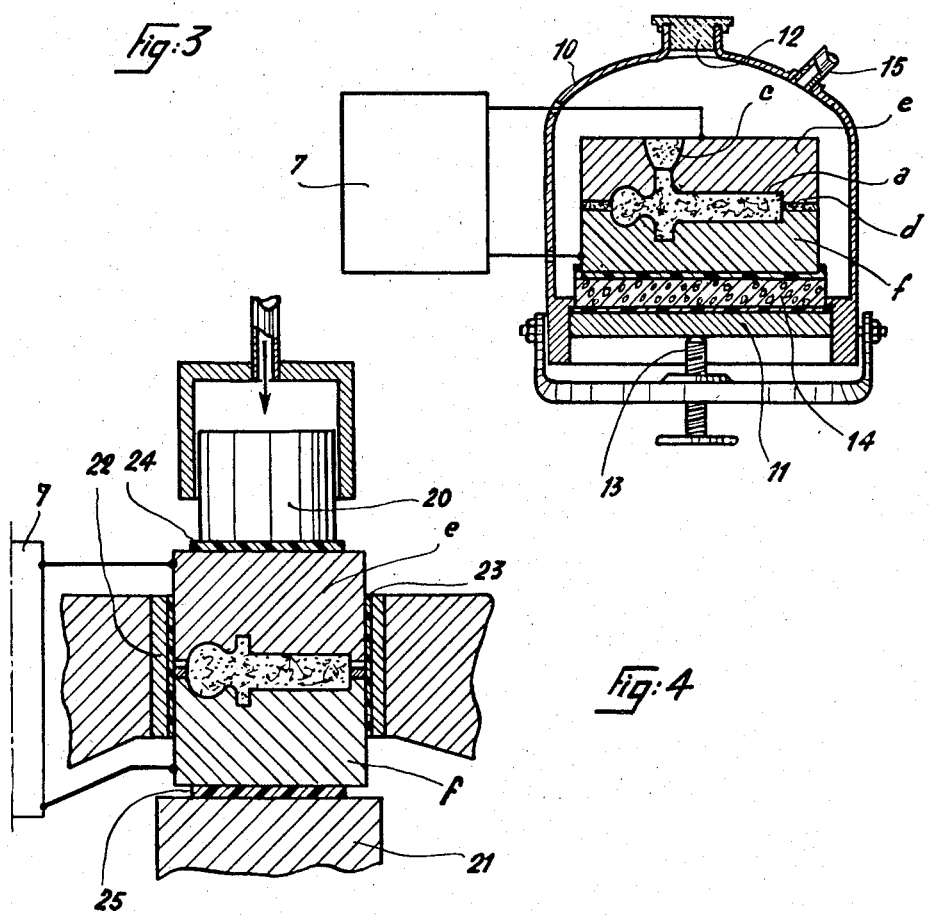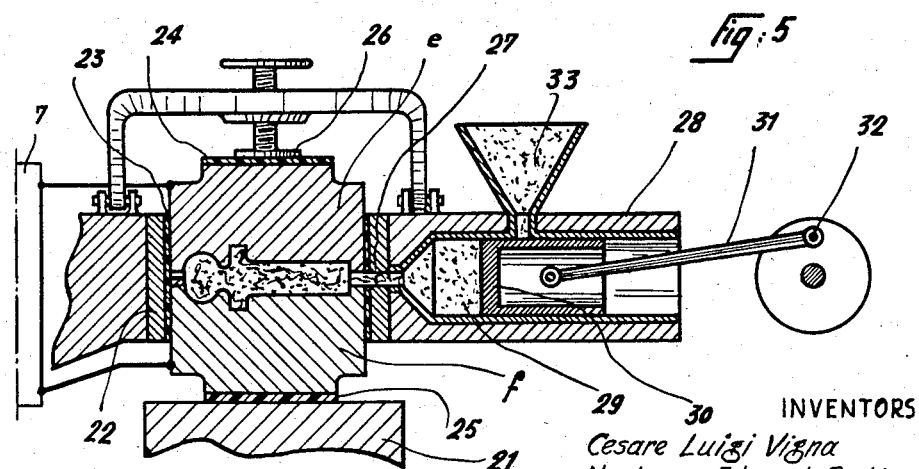

United States Patent Office 2,875,556
Patented Mar. 3, 1959

2,875,556

APPARATUS FOR MOLDING REFRACTORY MATERIALS

Cesare Luigi Vigna, Narisara Edward Perkins and Pierre Henri Raoul Leygonie, Paris, France, assignors to Per Vig Corporation, Washington, D. C., a corporation of Delaware Application July 31, 1953, Serial No. 371,504

1 Claim. (Cl. 49—68)

This invention relates to apparatus for melting and molding refractory materials such as refractory metals or metal oxides for the production of heat engine components. The disclosure of this application is related to the disclosure in the copending application of the same applicants, filed July 20, 1953, Serial No. 369,070 entitled "Structural Components For Heat Engines and Method of Making Same," and subsequently abandoned. In that copending application the applicants described the use of a melted metal oxide or a melted mixture of such oxides, especially melted mixture of magnesium oxide and aluminum oxide and particularly of melted spinel, for manufacturing new products such as parts for thermal machines, blades for gas turbines, combustion chambers or parts and inings for such chambers, nozzles for burners or injectors, etc. Such applications have produced in gas turbines remarkable results, in that they permitted operation of such turbines at temperatures far higher than the present customary temperatures, thus making it possible to increase the output of such turbines by a considerable extent.

The present invention deals with particular apparatus for forming the heat engine components to substantially the desired shape by directly molding them to their final shapes.

Since metal oxides have a high melting point and since the solids obtained from them through solidification after melting are very hard and difficult to fabricate to the desired shapes, it is especially important to discover a process permitting solidification of these oxides, after melting, to a form as close as possible to the shapes desired.

The present invention solves this problem.

The starting material is in the form of a powder, preferably of a fine grain so as to permit compacting the same. The powder is confined in a mold cavity, the inside of which has the shape of the solid object to be made, and consists of a sufficiently refractory material so as to permit the melting of the powder therein. The mold may consist of several pieces so as to permit extraction of the solid shape obtained, and is placed in a high-frequency field which generates the heat necessary for melting the powder.

These metal oxides do not, or hardly do, conduct electricity at ordinary temperatures and become conductors only in the neighborhood of their melting point. Thus, for generating heat by means of inducted currents the powdered oxides must be placed in an electrically conductive mold consisting of a refractory metal such as tungsten. The induced currents are generated in the metal mold by the high-frequency field at the start of the operation, in such a manner that heat will be transmitted to the powdered oxide in contact with the metal mold. As a result, the layer of powder in contact with the inner wall of the mold is melted, becoming conductive, and in turn is heated by induced currents and melts the next inner layer of powder, thus bringing on gradually the melting of the entire charge of oxide.

It is also possible to resort to heating by means of dielectric losses, by placing the powdered oxide between two insulated conductive parts forming the mold and consisting of refractory metal, with the aforementioned mold parts forming the plates of a condenser connected to a high-frequency generator.

This invention can also be applied to the melting of metal powder so as to form, for example, refractory metal blades for gas turbines. This permits considerable simplification of present-day processes by eliminating the complications of the lost wax casting process which is customarily used for molding blades. For that purpose the mold could consist of any metal or nonconductive refractory material, since the induced currents could be generated directly and from the start in the powder which is to be melted.

It is therefore an object of this invention to provide a novel apparatus for melting and simultaneously molding refractory materials to the desired shapes.

It is an object of this invention to provide a novel apparatus for simultaneously melting and molding refractory powders to produce finished or substantially finished articles.

It is a still further object of this invention to provide a novel apparatus for melting refractory powders and forming them to the desired shapes in a single operation, thus eliminating substantially all machining steps to produce the objects desired.

The following description, taken in connection with the accompanying drawings, clearly discloses the operation of the present invention. In the drawings:

Fig. 1 is a schematic vertical section through one form of the apparatus, embodying the present invention and functioning by induction of high-frequency currents;

Fig. 2 is a horizontal sectional view taken along the line II—II of Fig. 1; and

Figs. 3, 4 and 5 are vertical sections through three different embodiments of apparatus embodying the present invention and in which the material to be melted is heated by dielectric losses.

In the form of apparatus illustrated in Figs. 1 and 2, the mold 1 consists of a very refractory material and is provided with a recess 2 corresponding to the shape of the solid object to be manufactured. In the case under consideration, the object to be manufactured is a turbine blade. As a result, the recess comprises a part $a$ corresponding to the body of the blade and another part $b$ corresponding to the base (foot) or "tail" of the blade, that is, to the means by which the blade is attached to a turbine wheel. The base may take the form of an oak leaf. Of course, any other shape may be given to the mold, as required by the particular shape of the base. Above the part $b$ the mold defines a bowl portion $c$ which may be open to the outside of the mold and the volume of which is determined by the decrease in volume of the powdered charge upon passage to the liquid stage as the result of fusion. In order to reduce the need for subsequent treatment as much as possible, the liquefied charge should fill only the parts $a$ and $b$ of the mold. Simple tests may be resorted to in order to determine the volume of the bowl portion $c$ for each type of powder.

In view of the complicated shape of the object concerned, the mold must consist of a plurality of separable parts so as to permit their separation to effect withdrawal of the object from the mold, unless the mold used consists of very inexpensive material and may be smashed; this could be the case if the charge to be melted is a metal powder and if as a result an insulating crucible consisting of a suitable compressed refractory material is used, such as ceramic. The drawing illustrates a mold split into two parts at the junction-plane $d$.

The outer form of the mold is that of a truncated cone. The mold fits into a jacket or muff 3, the inner shape of which also is that of a truncated cone. Said muff, which preferably consists of refractory metal, is hollow so that it may be cooled by circulation of an appropriate fluid entering at 4 and emanating at 5.

The muff 3 is surrounded by a helix of metal tubing 6 spaced from the muff and which forms the primary coil of the induction furnace. The ends of this coil are connected with the terminal clamps of a high-frequency generator 7. The helix 6 is preferably formed from a metal tube so as to facilitate its cooling by means of a suitable circulated fluid, such as water, oil, or air which enters at 8 into one end of the tubing and leaves at 9 by the opposite end.

As illustrated in Fig. 2, the helix or winding 6 is not truly cylindrical with a circular cross-section. It is preferable to adapt the cross-section of the helix to the cross-section of the recess 2 of the mold so as to concentrate as much as possible the lines of force of the field within this recess. In the case of the turbine blade illustrated, this will result in a helix having a sectional outline similar to the one shown in the section illustrated by Fig. 2, of generally a "fattened" replica of a cross-section of the turbine blade.

The unit formed by the mold 1, the muff 3 and the primary coil 6 is encased within a housing 10 which is equipped, for example, at its base, with a tightly closing cover 11 for supporting the muff 3 and the mold 1. The housing 10 may be provided with a window 12 which permits observation of the charge and checking of the moment when melting occurs. This window may be combined with a photoelectric cell, sensitive to the radiations emitted by the charge, and arranged to cut off the current of the generator 7 as soon as the radiations emitted by the charge indicate a molten state thereof.

The unit formed by the muff 3 and the mold 1 rests on the cover 11 which is held closed, for example, by a threaded screw 13 bearing on the cover 11 and supporting a block 14 of a suitable height so as to keep the mold properly positioned with respect to the coil 6. The housing 10 is preferably equipped with a drip nozzle 15 which may be connected with a vacuum pump for removing gases that may cause damage and form bubbles in the melted material.

In case the charge to be melted in the mold consists of powdered oxide, the mold 1 should consist of a highly heat resistant metal, such as tungsten, which melts at a substantially higher temperature than the powdered oxide. For example, spinel (a mixture of aluminum oxide and magnesium oxide) has a melting point of about 2000° C., whereas the melting point of tungsten is about 3370° C. The melting point of tungsten carbide is 2777° C. and even this material might successfully be used to form the mold.

The mold filled with powdered oxide is placed in the housing 10 and current from the high-frequency generator 7 is applied to the primary coil 6. Induction at first occurs mainly in the metallic mass of the tungsten mold 1 which becomes extremely hot. The mold heats the layer of powdered oxide which is in direct contact with it. This layer finally begins to melt and becomes conductive whereupon it also becomes directly responsive to the high-frequency field and is further heated by induced currents. Step by step the entire mass of powder heats up and melts. At this moment the current in the coil 6 is shut off and the melted mass is permitted to solidify in the mold. This solidification is facilitated by the fluid-cooling of muff 3. The cover 11 is then removed and connections for cooling of the muff 3 are unfastened, whereupon the unit consisting of the muff and mold is withdrawn from the housing 10. Thus there only remains the mold to be extracted from the muff and withdrawal of the object by separating the mold into its component parts.

In case a metal powder is to be melted, such as, for example, a mixture of powdered nickel, cobalt or chrome, etc., in order to produce blades from refractory metal, the mold 1 could consist of a refractory insulating material, such as calcined (roasted) or melted magnesium oxide or magnesium and aluminum oxides, known as spinel. The parts of a mold consisting of melted spinel could, per se, be manufactured by the process described above.

In the modification illustrated in Fig. 3, the two parts e—f of the mold also fill the roles of the plates of a condenser connected to the terminal clamps of a high-frequency generator 7. These parts are separated from each other by a space d filled with a refractory dielectric with a much higher melting point than the material to be melted, for example, zirconium oxide if the powder to be melted in the mold is a mixture of magnesium oxide and aluminum oxide (spinel). The heating of the insulating powdered oxide, in this case, occurs by virtue of the dielectric losses in the powdered material. The upper plate e is formed with a bowl c which is connected by the shown passageway to a recess in the bottom face thereof, which recess defines at least a part of the mold cavity. The bowl c thus defines a reservoir to insure proper filling of the mold cavity when the powder melts, in accordance with the previous description.

In the modification illustrated in Fig. 4, the powder is subjected to pressure at the same time it is heated. For this purpose, the parts e—f of the mold which form the plates of a condenser, are pressed toward each other by means of a hydraulic press or a similar means having a movable piston 20 bearing on the upper part e and the fixed support or bed 21 supporting the lower part f. The mold is charged with an excess quantity of powder to such extent that, after shrinkage due to melting, the final volume is identical with the volume of the mold cavity. The charge may be in the form of a compressed briquette of about the same shape as the mold cavity but of greater volume. If the space between the two parts of the mold is packed with a refractory insulating material, it is necessary to arrange for a sufficient initial clearance or spacing so as to permit relative movement between the two parts of the mold. The two parts of the mold are slidably positioned inside a fixed guide 22 which is solidly connected with the frame of the press. The two parts can slide within this guide which surrounds them tightly with the exception of a small space 23 where an insulating joint may be inserted consisting, for example, of quartz or of a very refractory oxide such as zirconium oxide. Other insulating intermediaries may be positioned at 24—25, i. e., between the movable piston of the press and the upper part of the mold, on the one hand, and between the lower part of the mold and the fixed support 21, on the other hand. As an alternative, an insulating sleeve of refractory material could be fixed to either e or f and project therefrom sufficiently to snugly receive and guide the other mold part. Such a sleeve could have an inner sectional shape corresponding to and coincident with the outline of the mold cavity.

In the embodiment illustrated in Fig. 5, the two parts e—f of the mold are rigidly held in position in such a manner that they cannot move with respect to each other, by the fixed support 21 and the clamp means 26. The guide 22 which encloses the mold laterally is pierced by a passageway 27. The latter establishes communication between the cavity of the mold and a laterally positioned cylinder 28 which is filled at 29 with the same powder as present in the mold. Slidably fitting in the cylinder 28 is a piston 30 which may be driven in any suitable manner, for example, by the connecting rod 31 and a crank 32 for compacting and feeding the powder to be melted.

In this embodiment the melting of the powder occurs under pressure and the loss of volume resulting from the melting is compensated for by the introduction of additional powder into the mold cavity under the influence of piston 30 in cylinder 28. In such an arrangement, the condenser plates (mold parts e—f) are not displaced with respect to each other as the powder starts to melt. After removal of a finished object from the mold and replacement of the mold parts, the cylinder 28 is filled again with powder by moving the piston 30 to the right, with fresh powder dropping from the feed hopper 33 into the cylinder 28.

The above described devices permit melting of powdered metal oxides as described in the earlier filed application of the applicants herein, especially a powder consisting of a mixture of magnesium oxide (MgO) and aluminum oxide ($Al_2O_3$) in molecular quantities for obtaining blades and other parts for gas turbines or the like from melted synthetic spinel. This in turn makes it possible for a turbine to operate at a temperature of 1500° C.

The power and frequency of the high-frequency generator may be readily selected for the melting temperature of the particular powder to be molded. For a fusion temperature of approximately 2000° C., as in the case of spinel, a frequency of 400 kilocycles per second would be satisfactory.

While the drawings do not illustrate the use of a sealed housing for the modifications of Figs. 4 and 5, it is to be understood that the apparatus of those figures may be enclosed in a housing corresponding to the housing 10 of Figs. 1 and 3 and the process carried out in a substantial vacuum.

It is to be understood that the above described apparatus may be modified, substituting equivalent means, without departing from the scope of the invention as defined in the appended claim.

We claim:

A melting and molding apparatus comprising: a body of electrically conducting material comprising a plurality of complementary separable parts defining a mold cavity and having a melting point higher than about 2000° C.; means for inducing high-frequency electric currents in said body; means for maintaining said cavity in a filled condition; and means for cooling the outer surface of said body comprising a hollow cooling jacket having a recess therein of a size and shape to receive and hold said separable parts in position to define said mold cavity.

References Cited in the file of this patent

UNITED STATES PATENTS

| | | |
|---|---|---|
| 1,555,258 | Allcutt | Sept. 29, 1925 |
| 1,572,873 | Allcutt | Feb. 16, 1926 |
| 1,612,628 | George | Dec. 28, 1926 |
| 1,997,263 | Meissner | Apr. 9, 1935 |
| 2,048,319 | Benner et al. | July 21, 1936 |
| 2,151,874 | Simons | Mar. 28, 1939 |
| 2,317,597 | Ford et al. | Apr. 27, 1943 |
| 2,412,925 | Stupakoff | Dec. 17, 1946 |
| 2,423,915 | Wacker | July 15, 1947 |
| 2,436,999 | MacMillin et al. | Mar. 2, 1948 |
| 2,471,437 | Lester et al. | May 31, 1949 |
| 2,475,810 | Theuerer | July 12, 1949 |
| 2,595,502 | Aicher et al. | May 6, 1952 |
| 2,667,722 | Jenkins | Feb. 2, 1954 |